United States Patent
Cantu (10) Patent No.: US 7,140,622 B1
(45) Date of Patent: Nov. 28, 2006

(54) MOVIE CAMERA SKATE DOLLY (76) Inventor: Richard A. Cantu, 22117 Oxnard St., Woodlands Hills, CA (US) 91367

(*) Notice: Subject to any disclaimer, the term of this patent is extended or adjusted under 35 U.S.C. 154(b) by 8 days.

(21) Appl. No.: 10/807,617

(22) Filed: Mar. 23, 2004

Related U.S. Application Data (60) Provisional application No. 60/457,773, filed on Mar. 25, 2003.

(51) Int. Cl.
B62B 3/00 (2006.01)
(52) U.S. Cl. ............... 280/79.11; 280/47.34; 280/47.371; 108/55.3
(58) Field of Classification Search ........... 280/79.11, 280/79.2, 79.3, 79.4, 79.5, 79.6, 79.7, 32.6, 280/62, 63, 80.1, 47.11, 47.34, 47.38, 47.131, 280/47.16, 47.17, 47.2, 47.371, 47.39; 248/128, 248/129, 505, 500, 145.6, 168, 166; 211/85.8; 108/55.3; 16/30
See application file for complete search history.

(56) References Cited

U.S. PATENT DOCUMENTS

| 1,832,041 | A | * | 11/1931 | Moehler ............... 280/35 |
| 1,896,442 | A | * | 2/1933 | Farmer ............... 56/249 |
| 2,448,300 | A | * | 8/1948 | Eaddy ............... D11/82 |
| 2,707,351 | A | * | 5/1955 | Walker ............... 47/39 |
| 2,962,854 | A | * | 12/1960 | Jepson ............... 56/11.1 |
| 4,203,609 | A | * | 5/1980 | Mitchell et al. ....... 280/47.11 |
| 4,775,067 | A | * | 10/1988 | Mount ............... 220/573 |
| 5,004,255 | A | * | 4/1991 | Briggs ............... 280/79.5 |
| 5,136,751 | A | * | 8/1992 | Coyne et al. ............... 16/29 |
| 5,312,121 | A | * | 5/1994 | Chapman ............... 280/47.11 |
| 5,752,543 | A | * | 5/1998 | Groening ............... 137/312 |
| 5,823,549 | A | * | 10/1998 | Morgan, Jr. ............... 280/33.998 |
| 6,101,678 | A | * | 8/2000 | Malloy et al. ............... 16/438 |
| 6,209,891 | B1 | * | 4/2001 | Herrmann ............... 280/32.6 |
| RE37,350 | E | * | 9/2001 | Stephan ............... 280/79.5 |
| 6,345,828 | B1 | * | 2/2002 | Pool et al. ............... 280/32.6 |
| 6,371,496 | B1 | * | 4/2002 | Balolia ............... 280/35 |
| 6,439,515 | B1 | * | 8/2002 | Powers ............... 248/129 |
| 6,695,326 | B1 | * | 2/2004 | Morrow ............... 280/79.11 |
| 6,698,771 | B1 | * | 3/2004 | Bergeron ............... 280/47.35 |
| 6,843,625 | B1 | * | 1/2005 | Hewitt ............... 410/66 |
| 6,886,703 | B1 | * | 5/2005 | Bonner ............... 220/4.03 |

OTHER PUBLICATIONS

Super Peewee IV, Mar. 19, 2003 http://chapman-leonard.com/products/dollies/surper%20iv.htm.
Professional Film Systems Ultra Cine, Mar. 20, 2003 http://www.steadicam.com/profilm_ultra_cine.htm.

(Continued)

Primary Examiner—Christopher P. Ellis
Assistant Examiner—John Walters
(74) Attorney, Agent, or Firm—DLA Piper US LLP (57) ABSTRACT

An omni-directional, octagonal shaped, camera skate dolly that includes a platform having a generally planar upper surface, a lower surface and a plurality of side surfaces, and a plurality of wheel assemblies attached to the lower surface of the platform, wherein each of the wheel assemblies includes a swivel joint and a wheel. A central hole with a bar extending therethrough is formed in the upper surface, along with a plurality of tripod leg recesses and a pair of hand-hold holes. A detachable push handle assembly can be attached to the platform for movement manipulation. An outrigger assembly having a threaded post can be attached to the platform to fix its position on the ground. A fixed wheel assembly is attachable to the platform with wheels that guide the movement of the platform in a linear manner.

4 Claims, 6 Drawing Sheets

OTHER PUBLICATIONS

Camera Dollies http://www.premierstudioequipment.com/Products/Dollies.html.

Microdolly Hollywood Camera Support Systems—camera dollies, dolly track, jib arm cra . . . Mar. 20, 2003, http://microdolly.com/index3.html.

Panther—The Passion of Movement, Mar. 19, 2003 http://www.panther-gmbh.de/en/products/pick_up.asp?Folder=products&Seite=produkte.asp.

J.L. Fisher—Motion Picture And Television Equipment, Mar. 19, 2003 http://jlfisher.com.

Dollies, Jib Arms, & Tracks—Doorway Dolly, Mar. 19, 2003 http://www.birnsandsawyer.com/djt-doorwaydolly.htm.

Dolly 2000, Mar. 19, 2003 http://www.backstageweb.com/page26.htm.

Panther :: Filmequipment—Classic Dolly, Mar. 15, 2004 http://www.panther.gmbh.de/en/products/classic_dolly.asp?Folder=products&Seite=classi...

J.L. Fisher—Spyder Dolly, Mar. 15, 2004 http://www.jlfisher.com/dollies/spyder_dolly/topbar.asp.

Super Peewee II, Mar. 15, 2003 http://www.chapman-leonard.com/products/dollies/surper%20peewee%20ii.htm.

* cited by examiner

MOVIE CAMERA SKATE DOLLY

This application claims the benefit of U.S. Provisional Application No. 60/457,773, filed Mar. 25, 2003.

FIELD OF THE INVENTION

The present invention relates to move camera equipment, and more particularly to a dolly used for manipulating a movie camera.

BACKGROUND OF THE INVENTION

In the world of motion picture and video production, there are many ways to move the camera in an artistic way. One of these ways is to use a camera dolly. Camera dollies come in all shapes and sizes. In film production there are several well known state-of-the-art dollies: the J.L.Fisher dollies (Burbank, Calif.), the Chapman Super Peewee dolly (North Hollywood, Calif.), and the Panther dolly (Munich, Germany). These dollies are massive four-wheel units which are designed to carry a mounted camera (using a fluid or geared head), while also accommodating a camera operator and an assistant cameraman. All these dollies can raise and lower the camera as well. The dolly is operated or steered by an additional person (the dolly grip). There is another state-of-the-art device that is designed to move the camera: the Steadicam. A camera operator wears a vest made of cloth and aluminum, where a spring-loaded arm is attached to the vest at one end and a camera and sled are attached to the other end, allowing the camera to "float." It takes years to master the Steadicam. All of these devices are costly, bulky and have a large footprint.

Most conventional dollies have four wheels with some kind of steering mechanism. In order to change direction, the user must steer the dolly much like a car. This type of steering introduces an arc as the dolly tracks over the ground, which does not allow for free, omni-directional movement. Conventional dollies also require a dolly grip just to operate the dolly itself. In order to make a tracking move with a conventional dolly, the camera operator sits on the dolly and communicates with the dolly grip where he wants the dolly to go. This communication goes on before, or sometimes during a shot. If adjustments are necessary during the shot, the camera operator may not always be able to relate this new information to the dolly grip in time to make those adjustments.

Currently, the most popular way to move a camera without a dolly is simply to put the camera on the operator's shoulder and walk. This method is know as "hand-held." One draw back to the hand-held method is that it is difficult to shoot a low angle shot while walking or running. The lens height is the shoulder height of the camera operator. If he/she wants to move while shooting, he/she walks or runs. If the operator wants to shoot a low angle shot he/she sits down. If the operator wants to shoot a low angle tracking shot, the camera becomes too cumbersome. Crouching down with a 20 lb camera on your shoulder while walking or running can be quite difficult. The camera shakes far more than is desirable in a normal hand-held shot rendering it unusable.

Conventional dollies are not designed for hand-held shots. Their primary function is to mount a camera to the dolly using a fluid head or a geared head. This is why they are so large and heavy and require a dolly grip to operate. What is missing is a means of achieving a low angle hand-held shot without the expense of a Steadicam, or the use of a bulky dolly.

SUMMARY OF THE INVENTION

The present invention is a movie camera skate dolly that addresses the deficiencies noted above. The skate dolly of the present invention is an omni-directional dolly that can be operated by the camera operator alone or with the assistance of a dolly grip. The skate dolly is lightweight, very maneuverable and does not require electricity to run.

The dolly of the present invention includes a platform having a generally planar upper surface, a plurality of wheel assemblies attached to a lower surface of the platform wherein each of the wheel assemblies includes a swivel joint and a wheel, a hole formed in the upper surface, a mounting bar extending across the hole, and a plurality of recesses formed in the upper surface.

In another aspect of the present invention, the dolly includes a platform having a generally planar upper surface, a lower surface and a plurality of side surfaces, wherein the upper and lower surfaces are octagonal in shape, and a plurality of wheel assemblies attached to the lower surface of the platform, wherein each of the wheel assemblies includes a swivel joint and a wheel;

Other objects and features of the present invention will become apparent by a review of the specification, claims and appended figures.

DETAILED DESCRIPTION OF THE PREFERRED EMBODIMENTS

Figure 1:
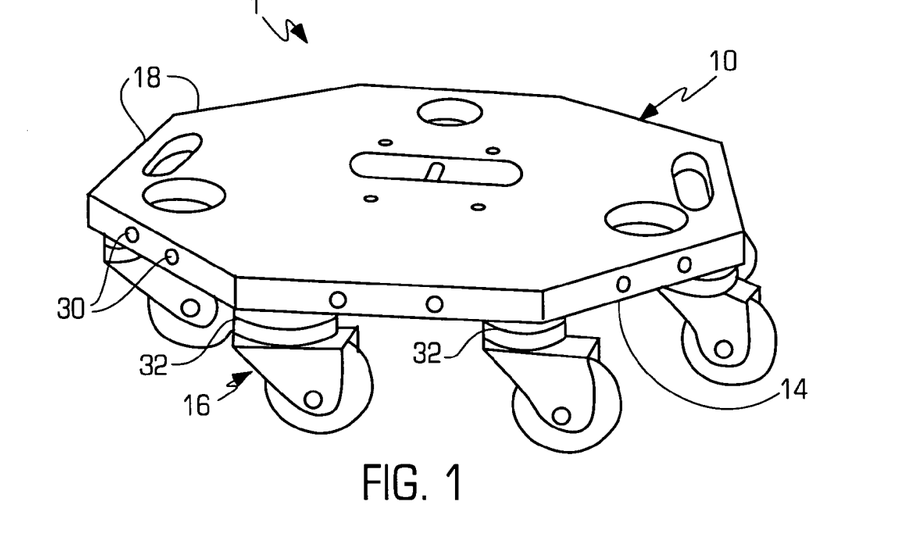
FIG. 1 is a perspective view of the skate dolly of the present invention.
Figure 2:
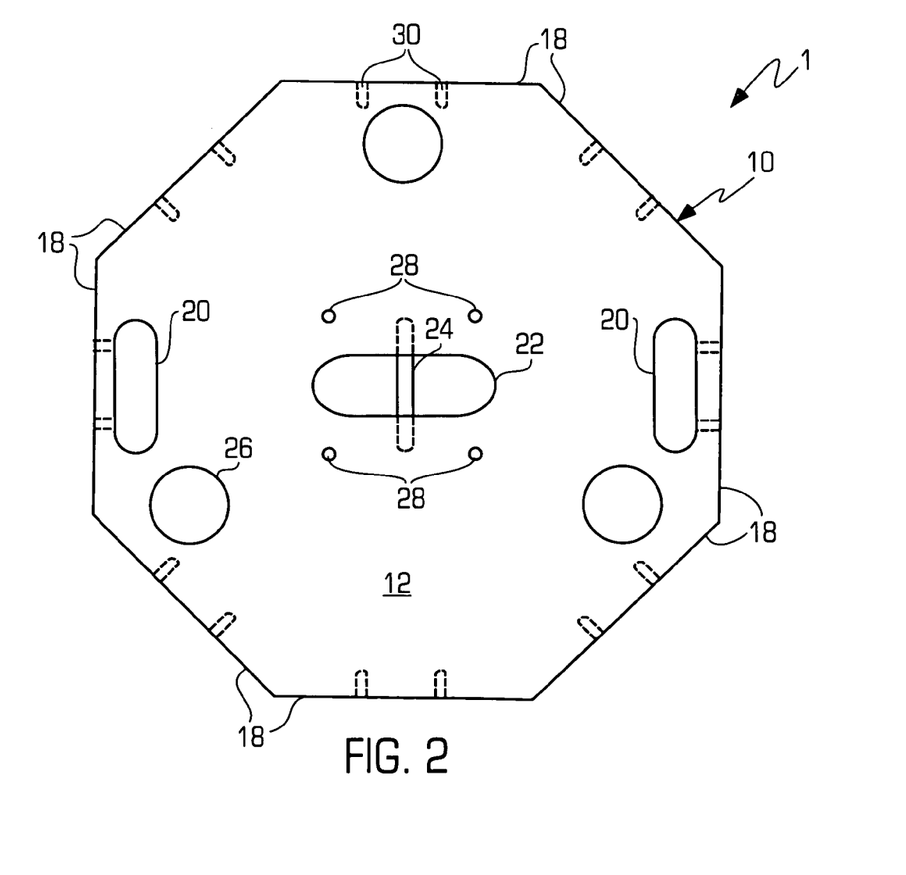
FIG. 2 is a top view of the skate dolly of the present invention.
Figure 3:
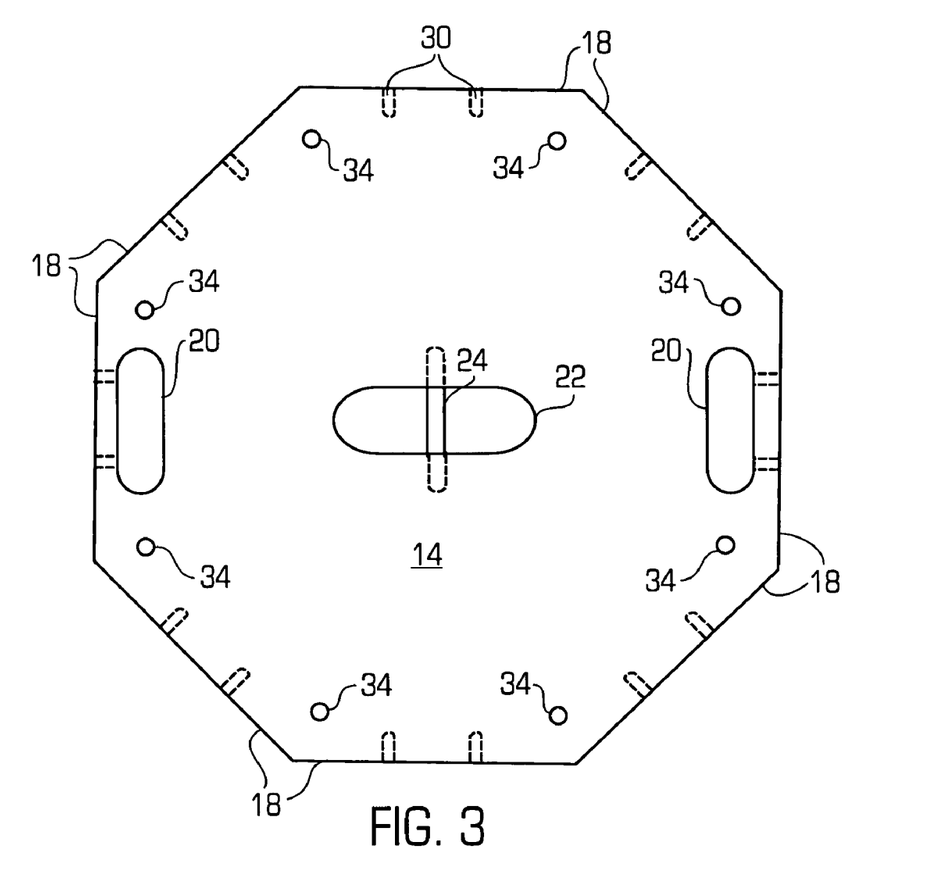
FIG. 3 is a bottom view of the skate dolly of the present invention.

The skate dolly 1 of the present invention is illustrated in FIGS. 1–3, and includes a platform 10 with generally planar upper and lower surfaces 12 and 14, and a plurality of wheel assemblies 16 mounted to lower surface 14.

Platform 10 is preferably octagon shaped, having eight evenly sized platform sides 18. A pair of hand-hold holes 20 are formed through the platform, adjacent a pair of opposing platform sides 18. A central hole 22 is formed through the center of the platform 10, with a mounting bar 24 rigidly extending across the hole 22. Three tripod recesses 26 are formed into the top surface 12. Threaded mounting holes 28 are formed into the top surface 12 adjacent the central hole 22, and threaded mounting holes 30 are formed into each of the platform side surfaces 18. Wheel assemblies 16 are conventional high-performance casters each including a swivel joint 32 (allowing 360 degree rotation) that mounts to one of a plurality of threaded holes 34 formed in the lower surface 14, and a wheel 36.

There are four distinct features on the upper surface 12 of the platform 10. First, the hand-hold holes 20 are located at opposite each other, and are preferably milled completely through the platform 10. The hand-hold holes 20 make the dolly easy to carry, and they provide a hole through which straps can be used to mount items to the platform 10. Second, the tripod recesses 26 are equally spaced apart on the upper surface 12, and provide a non-slidable support for tripod legs on the upper surface 12. Third, the mounting bar 24 is provided at the center of the upper surface 12, and provides the structure to which straps or hardware can be mounted. Fourth, the upper surface 12 is generally planar (except for holes 20/22 and recesses 26), allowing the greatest versatility for camera equipment support. This generally planar surface can accommodate a camera operator, apple boxes, additional ballast (like sandbags) on its surface, tripod feet, etc.

The wheel assemblies 16 are each provided adjacent one of the corners of the platform 10 (i.e. adjacent the junction of two platform sides 18), to provide a smooth and stable ride. These eight wheel assemblies, working together, are what gives the skate dolly 1 its truly unique omni-directional ability, as the wheel assemblies 16 freely rotate into the direction of dolly movement.

An exemplary embodiment of the dolly 1 of the present invention has been made with the following dimensions, however the numerical values recited herein are for illustration purposes only, and should not limit the scope the invention as claimed. The platform 10 has been made of one inch thick aluminum, with opposing platform sides being separated by 20 inches. The upper surface 12 is disposed about six inches off the ground with a weight capacity of over 1200 lbs. The skate dolly 1 preferably weighs no more than 45 lbs, as opposed to conventional dollies weighing hundreds of pounds and standing up to 3 feet in height. Threaded mounting holes 28, 30 and 34 are ⅜ inches in size, and between ¾ and 1 inch deep.

Figure 4:
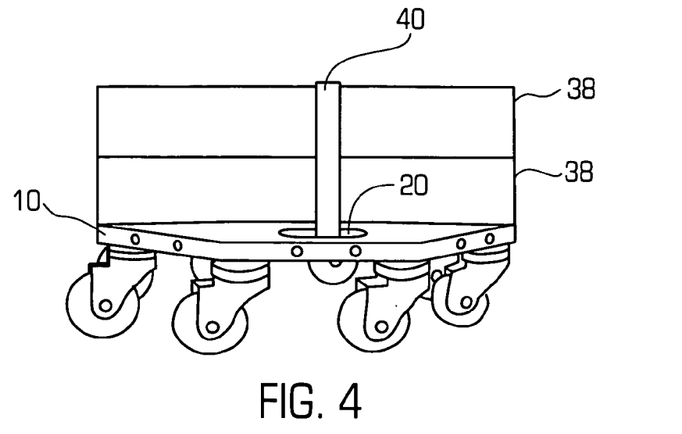
FIG. 4 is a side view of the skate dolly of the present invention with apple boxes strapped thereto.

As previously stated, the skate dolly 1 preferably sits 6 inches off the ground, so the lowest the camera height could be six inches, or if hand-held then the shoulder height of the seated operator on the platform 10 plus six inches. There are several different ways to change the camera height relative to platform 10. For example, "apple boxes" 38 are readily available on film and video shoots, which are rectangular shaped boxes typically made out of plywood and come in a variety of sizes: full, half, quarter, and pancake. The dimensions of apple boxes are standardized in the film and video industry, and are typically 20 inches long and 12 inches wide. The only difference is the depth: the full is 8 inches deep, the half is 4 inches deep, the quarter is 2 inches deep, and the pancake is 1 inch deep. This is why the preferred dimensions of the skate dolly is a 20×20 inch octagon. An apple box fits perfectly on the platform's generally planar upper surface 12, so that no corners of the apple box are sticking out. The octagon shape is preferable to a circular shape, because it minimizes the material needed to support apple boxes (for reduced weight), and provides the smallest possible footprint without apple box overhang. If needed, the apple boxes can be secured to the skate dolly by running a strap 40 through the hand-hold holes 20 and over the apple boxes, as illustrated in FIG. 4. The camera height can be determined by any combination of stacked apple boxes.

Figure 5:
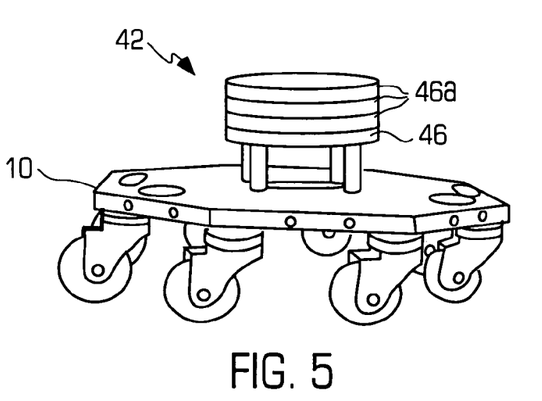
FIG. 5 is a side view of the skate dolly of the present invention with a high-hat camera mount attached thereto.

Another way to adjust camera height relative to platform 10 is by using a "high-hat" camera mount 42, as shown in FIG. 5. High hat cameral mount 42 includes a plurality of support posts 44 that attach (screw into) mounting holes 28. A support plate 46 mounts to the tops of support posts 44. The camera mounts to support plate 46. The height of the camera can be varied by varying the length of support posts 44 and/or adding additional support plates 46a (of equal or different sizes) over support plate 46.

Figure 6:
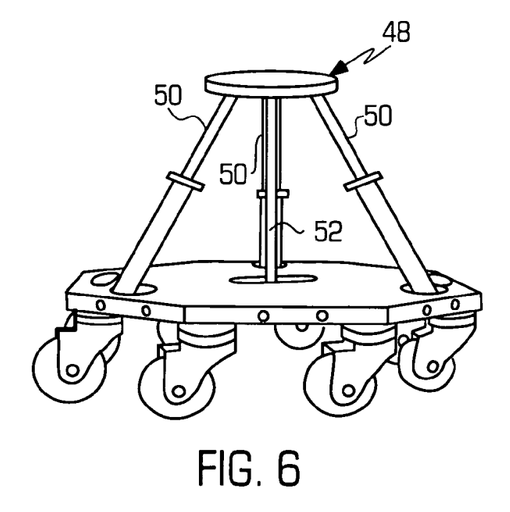
FIG. 6 is a side view of the skate dolly of the present invention with a tripod attached thereto.

Camera height adjustment can also be achieved by mounting a tripod 48 to the platform 10, as illustrated in FIG. 6. The tripod 48 includes legs 50 each of which sit in one of the recesses 26. The tripod 48 also includes a strap 52 that extends down to and connects with mounting bar 24 to securely hold the tripod 48 (and any camera mounted thereto) to the platform 10. Recesses 26 prevent the tripod legs 50 from moving or slipping on the platform upper surface 12. For higher tripod settings, sandbags can be placed on the platform to lower the center of gravity of the tripod/dolly to achieve a lens height of over 6 feet without rendering the skate dolly unstable.

To operate the camera with either a tripod, high-hat mount or apple box, the operator can use a fluid head and lock the pan on the head, so that the skate dolly 1 will pan effortlessly on its eight high-performance casters 16. In this manner, only the tilt portion of the head need be operated. To make a move, the operator can use one hand on the tilt handle and the other on hand on the head, tripod, or apple box. The operator can now track along the ground without the need of a dolly grip. The operator can look through the eyepiece on the camera or attach an on-board video monitor. Using the monitor to compose while walking along side the skate dolly allows the operator to be aware of obstacles. With the dolly 1 of the present invention, the operator can react to changing situations on the fly (unlike the conventional dolly needing a dolly grip).

Figure 7:
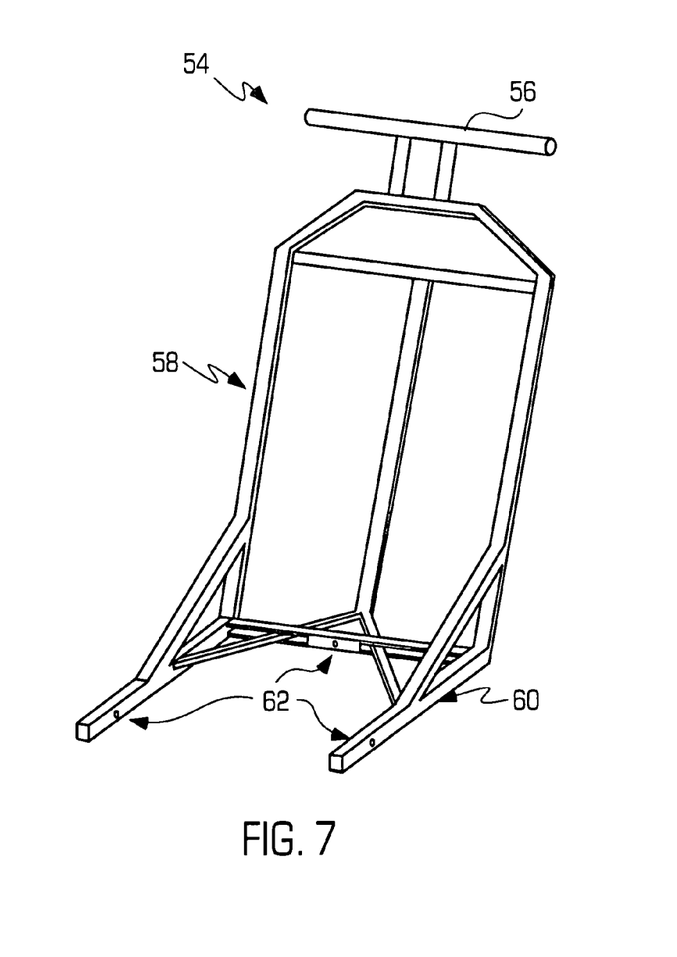
FIG. 7 is a perspective view of the push handle assembly for the dolly of the present invention.
Figure 8:
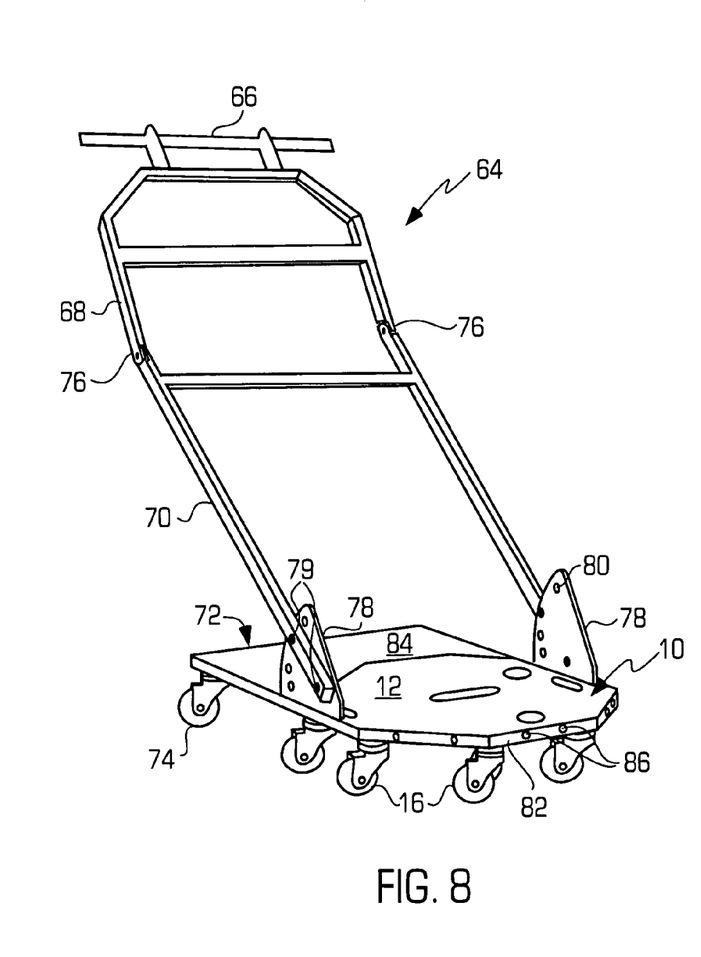
FIG. 8 is a perspective view of an alternate embodiment of the push handle assembly of the present invention.

FIG. 7 illustrates a push handle assembly 54 that can be used to manipulate the movement of dolly 1. The push handle 54 includes a handle member 56 connected to a frame 58, which attaches to the platform. The frame 58 includes a base 60 that wraps around five of the eight platform sides 18, and includes through holes 62 for bolting the frame base 60 to the platform 10 via mounting holes 30. Preferably, the handle 56, frame 58 and base 60 are made of one inch aluminum tubing. With the hand-held camera operator sitting directly on the skate dolly 1 or the apple boxes thereon, the dolly grip can maneuver dolly and camera operator thereon via the push handle assembly 54 around tight corners or in cramp spaces. This configuration also gives the hand-held camera operator the ability to do running hand-held shots. Operating a hand-held camera while running introduces a lot of camera vibration. If the camera operator were to sit on the skate dolly 1 directly or on apple boxes and harness himself onto the skate dolly 1 with the push-handle 54, then the dolly grip could take off running while the operator sits comfortably on the skate dolly 1. This technique produces a much steadier image yet still maintains the hand-held look. Should there be a need to boom up and down, a small jib arm in conjunction with a remote head of the camera can be used to raise or lower the camera relative to the skate dolly.

Figure 9:
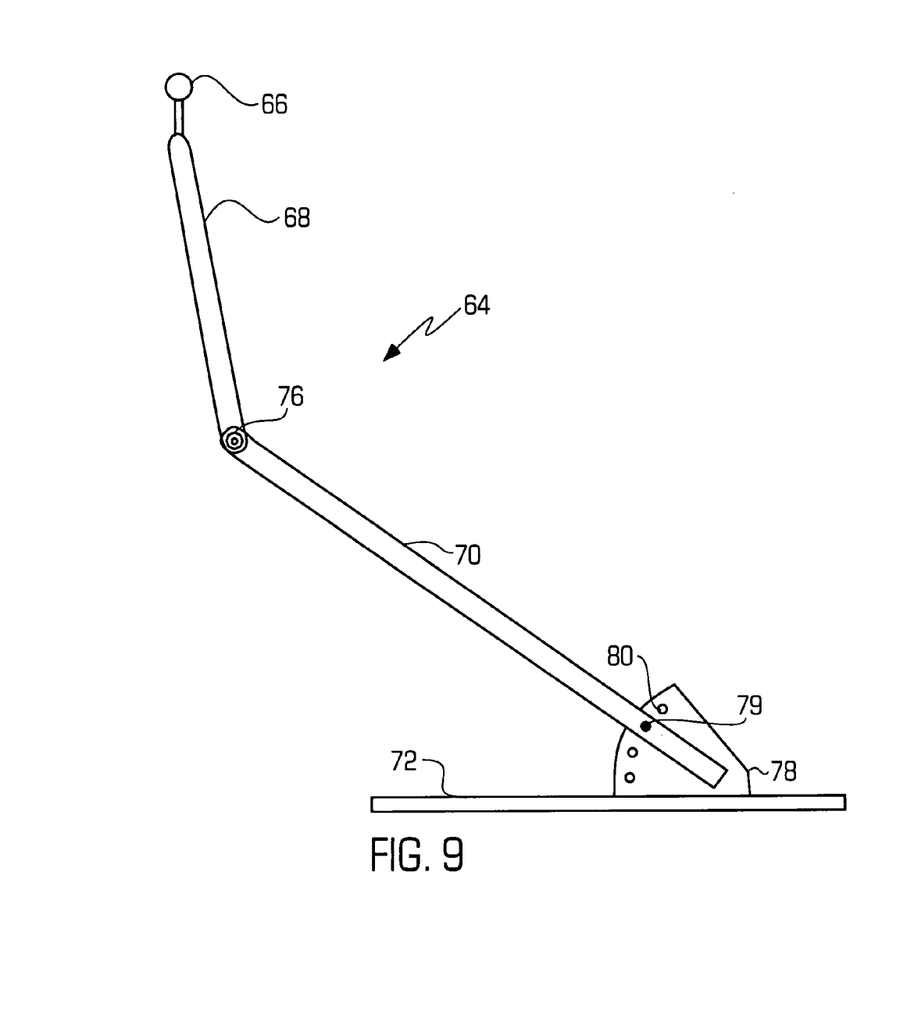
FIG. 9 is a side view of the alternate embodiment of the push handle assembly of the present invention.
Figure 10:
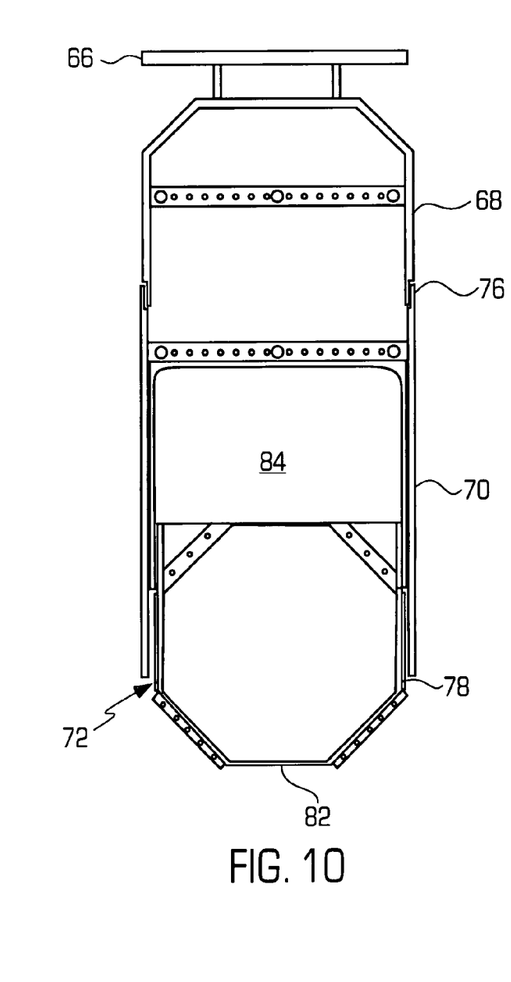
FIG. 10 is a top view of the alternate embodiment of the push handle assembly of the present invention.

FIGS. 9–10 illustrate an alternate embodiment of the push handle assembly for manipulating the dolly 1. Push handle assembly 64 includes a handle member 66, an upper handle support 68, a lower handle support 70, a base frame 72, and a plurality of wheel assemblies 74. Upper handle support 68 is rotatably connected to the lower handle support 70 via locking hinges 76. Lower handle support 70 is rotatably connected to plates 78 via bolts 79. Plates 78 (which are part of the base frame 72) have a plurality of through holes 80 for setting the angle at which the lower handle support 70 extends from the base frame 72. Base frame 72 includes an octagonal shaped frame portion 82 in which the platform 10 inserts, a platform 84, and a plurality of wheel assemblies 74 supporting the frame portion 82. Platform 10 inserts within the octagonal shaped frame portion 82, and is mounted thereto via bolts 86 that engage with the threaded mounting holes 30 of platform 10. A pair of wheel assemblies 74 similar to wheel assemblies 16 are mounted underneath, and support, base frame 72. The platform 84 has an upper surface that is preferably flush with platform upper surface 12. The angular orientation of upper/lower handle supports 68/70 via hinges 76, and lower handle support 70 and base frame 72 via bolts 79 and holes 80, allow the push handle assembly 64 to be oriented in a variety of configurations depending on the particular needs of the camera shot.

Figures 11, 12:
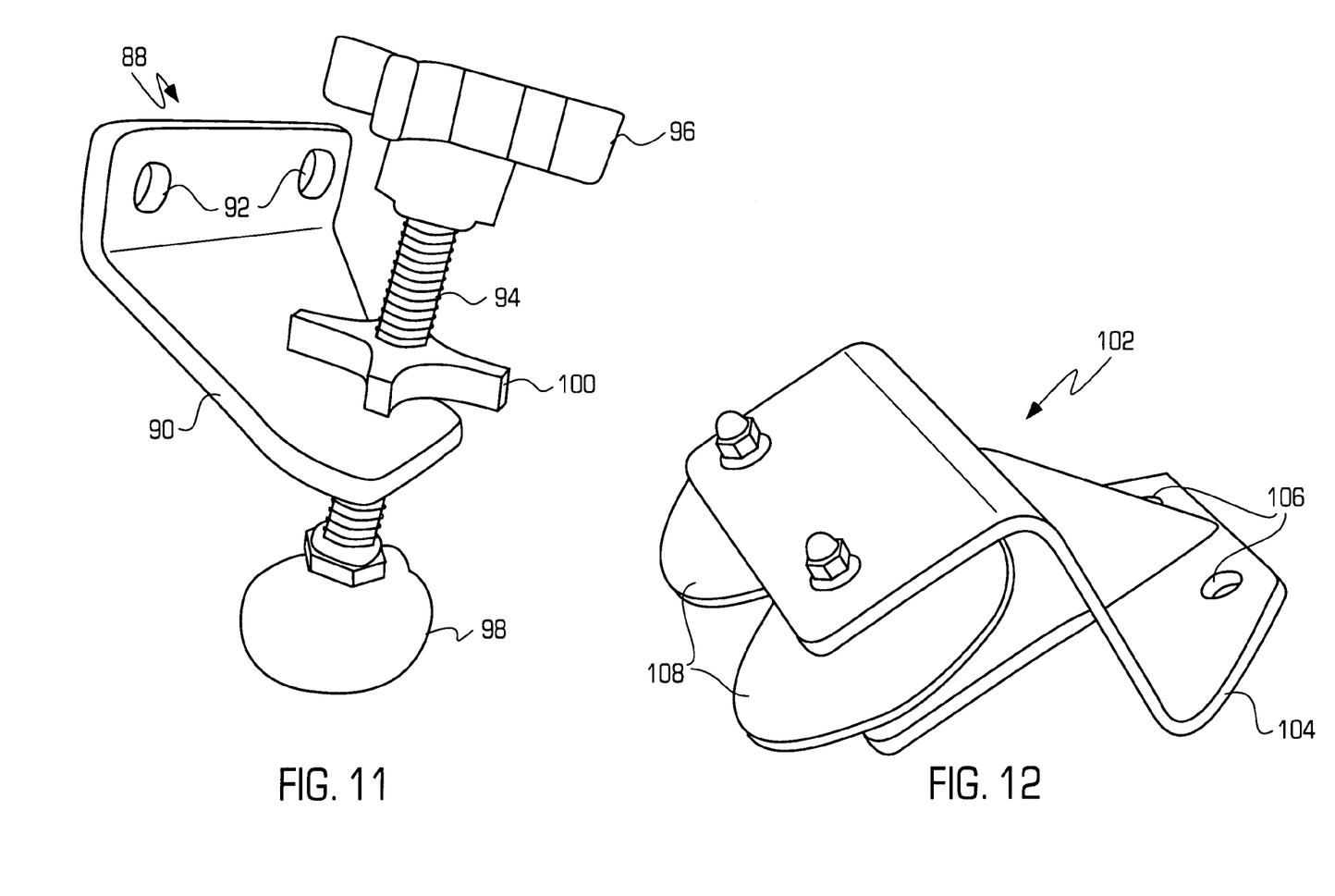
FIG. 11 is a perspective view of the outrigger assembly of the present invention.
FIG. 12 is a perspective view of the fixed wheel assembly of the present invention.

FIG. 11 illustrates an outrigger assembly 88 that includes a mounting plate 90, a pair of holes 92 for bolting the plate 90 to the platform mounting holes 30 (or to the push handle 54/64), and a threaded shaft 94 extending through a threaded hole in the mounting plate 90. When mounted to one of the platform sides 18 (or the push handle 54/64 attached thereto), the outrigger assembly 88 can be used to fix the position of the dolly 1 on the ground by rotating the handle 96 of the threaded shaft 94 until the shaft 94 (or a rubber foot 98 attached to the end thereof) engages with the ground and holds the dolly 1 in place. Lock nut 100 is used to keep the shaft 94 from rotating both when the shaft engages with or is retracted from the ground. Ideally, two or more outrigger assemblies 88 can be used to stably fix the position of dolly 1.

FIG. 12 illustrates a fixed wheel assembly 102 that includes a mounting plate 104, a pair of holes 106 for bolting the plate 104 to the platform mounting holes 30 (or to the push handle 54/64), and one or more wheels 108 mounted to the plate 104. When mounted to one of the platform sides 18 (or the push handle 54/64 attached thereto), the fixed wheel assembly forces the platform 10 to roll in a straight line. Preferably, a pair of fixed wheel assemblies 102 are used (mounted on a pair of opposing platform sides 18 or push handle 54/64), when linear movement of the dolly is desired.

The skate dolly 1 as described above has many advantages. It provides for smooth, omni-directional movement (even spinning movement), unless the fixed wheel assembly 102 is used to confine the dolly to linear movement. No tracks are required, and there are no turning radius limitations. It can literally go in any direction on a whim, and thus provides true omni-directional movement. The skate dolly can be operated alone by the camera operator, which allows for a one-person operation that simplifies and streamlines getting the shot. The camera operator can sit on the dolly and use his/her feet to shuffle along the ground effortlessly in any direction without the aid of anyone. The camera operator can also start a hand-held shot standing or even walking, then sit on the skate dolly and continue tracking at a lower angle. Conversely, the operator can start a tracking low angle shot on the skate dolly then stand and continue the shot standing or walking, which is an option no current dolly affords. Thus, dolly 1 is ideal for low angle hand-held dolly shots (tracking shots).

Dolly 1 is durable, lightweight, inexpensive and simple to use in comparison to conventional dollies. Dolly 1 is highly portable, and easy to carry (like an oversized briefcase) using hand-hold holes 20. The preferred embodiment of the skate dolly has a 20×20 inch footprint making it smaller, more agile and easier to maneuver in tight places than conventional dollies. It can easily be tossed in the trunk of a car or checked as personal baggage on a flight. The skate dolly 1 can be used on multimillion-dollar film productions, commercials, music videos, industrials, news, or sporting events large and small. It can also be used on low budget digital-videos projects; mom and pop produced wedding videos or student films.

It is to be understood that the present invention is not limited to the embodiment(s) described above and illustrated herein, but encompasses any and all variations falling within the scope of the appended claims. For example, materials and numerical examples described above are exemplary only, and should not be deemed to limit the claims. The dolly of the present invention is not limited to manipulating movie cameras, but can be used to manipulate any type of equipment or personnel holding such equipment such as movie equipment (video cameras, still cameras, lighting equipment, sound equipment, etc.).

What is claimed is:

1. A dolly comprising:
   a platform having a generally planar upper surface;
   a plurality of wheel assemblies attached to a lower surface of the platform, wherein each of the wheel assemblies includes a swivel joint and a wheel;
   a hole formed in the upper surface;
   a mounting bar extending across the hole;
   a plurality of recesses formed in the upper surface;
   a plurality of threaded mounting holes formed in the upper surface; and
   a high hat camera mount that includes a plurality of support posts threaded into the threaded mounting holes and a support plate attached to the support posts.

2. A dolly, comprising:
   a platform having a generally planar upper surface;
   a plurality of wheel assemblies attached to a lower surface of the platform, wherein each of the wheel assemblies includes a swivel joint and a wheel;
   a hole formed in the upper surface;
   a mounting bar extending across the hole;
   a plurality of recesses formed in the upper surface;
   a push handle assembly attached to the platform, the push handle assembly including:
      a frame removably attached to the platform; and
      a handle member attached to the frame;
   wherein a position of the dolly is controllable by pushing on the handle member; and
   wherein the platform is a first platform, and wherein the push handle assembly further includes:
      a second platform attached to the frame, wherein the second platform is disposed adjacent to and flush with the first platform.

3. A dolly, comprising:
   a platform having a generally planar upper surface;
   a plurality of wheel assemblies attached to a lower surface of the platform, wherein each of the wheel assemblies includes a swivel joint and a wheel;
   a hole formed in the upper surface;
   a mounting bar extending across the hole;
   a plurality of recesses formed in the upper surface;

a push handle assembly attached to the platform, the push handle assembly including:
  a frame removably attached to the platform; and
  a handle member attached to the frame;
wherein a position of the dolly is controllable by pushing on the handle member;
wherein the platform is octagonal in shape; and
wherein the frame includes an octagonal shaped portion dimensioned to receive the platform therein.

4. A dolly, comprising:
a platform having a generally planar upper surface, a lower surface and a plurality of side surfaces, wherein the upper and lower surfaces are octagonal in shape;
a plurality of wheel assemblies attached to the lower surface of the platform, wherein each of the wheel assemblies includes a swivel joint and a wheel;
a push handle assembly attached to the platform, the push handle assembly including:
  a frame removably attached to the platform; and
  a handle member attached to the frame;
wherein a position of the dolly is controllable by pushing on the handle member; and
wherein the frame includes an octagonal shaped portion dimensioned to receive the platform therein.

\* \* \* \* \*